United States Patent [19]
Carp

[11] Patent Number: 4,938,061
[45] Date of Patent: Jul. 3, 1990

[54] CURRENT CONTROLLED ELECTRONIC CIRCUIT FOR A HOT WIRE AIR FLOW METER

[75] Inventor: Ralph W. Carp, Newport News, Va.

[73] Assignee: Siemens-Bendix Automotive Electronics L.P., Troy, Mich.

[21] Appl. No.: 252,947

[22] Filed: Sep. 30, 1988

[51] Int. Cl.[5] .............................................. G01F 1/68
[52] U.S. Cl. ................................ 73/204.19; 73/118.2
[58] Field of Search .............. 73/118.2, 204.18, 204.19

[56] References Cited
U.S. PATENT DOCUMENTS
4,672,847 6/1987 Uchiyama et al. ................ 73/204.19

Primary Examiner—Jerry W. Myracle
Attorney, Agent, or Firm—Russel C. Wells; George L. Boller

[57] ABSTRACT

A current controlled electronic circuit for a hot wire air flow meter having a symmetrical bridge circuit to measure the mass of the airflow. The present current bridge arrangement requires very few adjustments to select a few resistors for obtaining a required temperature differential and compensation for variations in the temperature coefficient of resistance of both the heated and cold resistors. This is accomplished by placing of a voltage divider in parallel with the sensing leg and a first amplifier responding to the voltage divider and the sensing let to control the current in the compensation leg. A second amplifier responds to the compensation leg for controlling the power to the sensing leg.

5 Claims, 1 Drawing Sheet

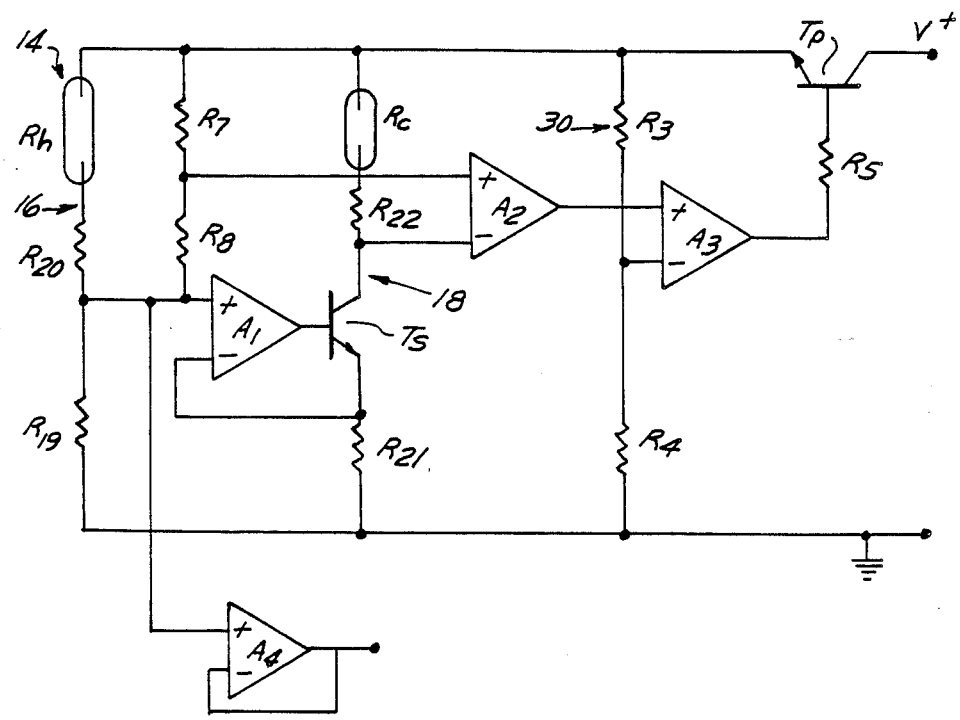

CURRENT CONTROLLED ELECTRONIC CIRCUIT FOR A HOT WIRE AIR FLOW METER

BACKGROUND AND SUMMARY OF THE INVENTION

The present invention relates to a symmetrical bridge circuit useful in a mass flow air sensor to measure the mass of airflow into an internal combustion engine.

The basic measurements in fuel injection systems are the measurements for determining the amount of fuel to be supplied to the engine. Air/fuel ratios are satisfied by measuring the amount of air intake to the engine and then supplying the proper amount of fuel under control of scheduling tables located in the electronic control unit (ECU).

The most common method to determine the amount of fuel to be injected is to measure the manifold pressure and engine speed and from these measurements determine the amount of fuel. Hot wire anemometers and swirl meters are examples of devices for measuring the amount of air flowing into the engine and with this measurement, the amount of fuel is calculated.

In many devices, a bridge circuit is used in the measuring circuitry. The bridge consists of a heated leg responsive to air flow and a unheated leg responsive to air temperature. The unheated leg is used to compensate the anemometer for changes in air temperature. The unheated leg must not be heated by the circuit. In some, a low resistance is used in the heated leg and a high resistance element is used in the unheated leg. In these situations, both elements are operated at the same voltage requiring the matching of the temperature coefficients of the resistance material with the different values of resistance. It is desirable to use the same type element in both legs.

A modification of the above mentioned bridge circuit is to divide the voltage to the leg containing the unheated resistance element and then amplify or multiply the voltage output to cancel the division. This generally requires the use of capacitor compensation to assure stability of the gain stage of the amplifier which in turn slows down the circuit response.

Still other solutions have placed the unheated resistance element in the feedback circuit of an amplifier in the bridge circuit. This requires a number of interactive function adjustments and a regulated voltage reference.

In my invention illustrated in U.S. Pat. No. 4,637,251, I have proposed a current bridge circuit which operates by balancing the current flow between a heated and cold leg of a resistance bridge which operates over a wide range of air flow to maintain a heated resistor at a given increased temperature differential above a colder resistor. In this case both the heated and cold resistor are temperature sensitive resistors. The operative circuit as illustrated in FIG. 3 of my patent requires for its operation the precise balancing of a large number of resistors. As such, in a production environment this circuit may prove to be relatively difficult to adjust the various resistors to compensate for differences in the temperature coefficient of resistance of the hot and cold resistors and also to modify these resistors to maintain a precise and desired temperature differential of the heated resistor.

In contrast, the present invention provides for a relatively simple and straight forward current bridge arrangement requiring very few, if any, adjustments to a select few resistors to obtain the required temperature differential and compensation for variations in the temperature coefficient of resistance of the heated and cold resistors.

It is an object of the present invention to sense airflow by balancing the current flow in a current bridge arrangement.

Accordingly the invention comprises a circuit comprising:

power driver means, adapted to be connected to a voltage source for supplying current in response to a control signal;

means for maintaining a desired temperature offset between a first temperature variable resistor and a second temperature variable resistor comprising:

a current bridge (14) adapted to be positioned in an air-flow comprising a sensing leg (16) including the first temperature variable resistor ($R_h$) and a first offset resistor ($R_{20}$) and a compensation leg (18) including the second temperature variable resistor ($R_c$) and a second offset resistor ($R_{22}$), current stabilizing means connected to the sensing leg (16) and compensation leg (18) for causing the current flow in such legs to be at a specified ratio, including a first amplifier ($A_1$) having its positive input connected to a first resistor ($R_{19}$) which is connected in series with the sensing leg and a second resistor ($R_{21}$), the output of the first amplifier is connected to a first transistor ($T_s$) which completes a series connection between the compensation leg and the second resistor, these first and second resistors are chosen to generate such specified ratio;

a first voltage divider is connected across the sensing leg, comprising third and fourth resistors having approximately the same ratio as the first and second resistors;

a second amplifier having a positive input connected to a junction between the third and fourth resistors and its negative input connected to sense the voltage across the compensation leg, and an output of the second amplifier communicated to and used to regulate the power driver means.

Many other objects and purposes of the invention will be clear from the following detailed description of the drawings.

BRIEF DESCRIPTION OF THE DRAWINGS

In the Drawings:

FIG. 1 illustrates a circuit diagram incorporating the present invention.

DETAILED DESCRIPTION OF THE DRAWINGS

As mentioned above the present invention relates to a current bridge which includes means for balancing the current flow in various legs of the bridge by selectively changing the resistance of a sensing element. With reference to FIG. 1 there is shown a schematic diagram of the present invention. A reference voltage source, V, is input to the circuit 10 at node 12, and communicated to the collector terminal of a Power transistor $T_p$. The emitter of transistor $T_p$ is communicated to a sensing or hot resistor $R_h$, a compensation or cold resistor $R_c$, a voltage divider circuit comprising resistors $R_7$ and $R_8$ and to another voltage divider circuit comprising resistors $R_3$ and $R_4$. The circuit 10 comprises a resistive bridge generally illustrated as 14 comprising a sensing leg which includes the sense resistor $R_h$ and an offset resistor $R_{20}$ and a compensation leg comprising resistor $R_c$ and another offset resistor $R_{22}$. In the preferred embodiment of the invention, the resistors $R_h$ and $R_c$ are temperature variable resistors in which the magnitude of the respective resistances vary with temperature. Such resistors ($R_h$ and $R_c$) are preferably of a platinum or nickel variety having a temperature coefficient of resistance (TCR) of approximately 3,000–3,300 parts per million per degree centigrade (TCR of nickel 5,000–5,500 ppm/° C.). Ideally, the resistors $R_h$ and $R_c$ are chosen to have identical temperature coefficients of resistance (TCR) and the identical resistance at ambient or room temperature. In the sensing or heated leg 16 of the bridge circuit 14 is the series combination of resistors $R_h$ and $R_{20}$. Resistor $R_{19}$ is in series with $R_h$ and $R_{20}$. One terminal of $R_{19}$ is connected to ground. The common terminal between resistors $R_{20}$ and $R_{19}$ is connected to the positive input of an amplifier designated as $A_1$. The first voltage divider comprising the series resistance combination of $R_7$ and $R_8$ is connected across the emitter terminal of the power transistor $T_p$ to the positive input of amplifier $A_1$. The output of amplifier $A_1$ is connected to the base of a transistor $T_s$ which is located in series with the compensation or cold leg 18 of the bridge circuit 14. The collector terminal of the transistor $T_s$, and a terminal of $R_{22}$ are communicated to the negative input of an amplifier $A_2$. The positive input of amplifier $A_2$ is connected to the common junction between resistors $R_7$ and $R_8$. The emitter terminal of transistor $T_s$ is communicated to the negative input terminal of amplifier $A_1$ and to ground potential through resistor $R_{21}$. The voltage appearing at the positive input terminal of amplifier $A_1$ comprises the controlled output voltage of the present invention which may be communicated to a voltage following amplifier $A_4$ as shown. The output of amplifier $A_2$ is connected to the positive terminal of an optional amplifier $A_3$, the negative input of which is communicated to the positive terminal between the second voltage divider 30 comprising resistors $R_3$ and $R_4$. The output of amplifier $A_3$ may be communicated via resistor $R_5$ to the base of the power transistor $T_p$. The circuit illustrated in FIG. 1 will operate adequately without amplifier $A_3$ by driving the power transistor $T_p$ directly or through a bias resistor $R_5$ from the output of amplifier $A_2$.

In operation the circuit 10 maintains the temperature of the sensing or hot resistor $R_h$ a predetermined level above the temperature of the compensation or cold resistor $R_c$. In the preferred embodiment this temperature differential is approximately 80° C. for all air flow conditions.

During ambient conditions, the circuit, if powered, will operate to generate the above desired temperature differential between $R_h$ and $R_c$. While it is desirable to have the sensing resistor $R_h$ and compensation resistor $R_c$ identical (in magnitude and having the same thermal temperature coefficient of resistance, TCR) in practice this is most often not practical.

Resistors $R_{20}$ and $R_{22}$ provide an off-set control function to move the initial temperature differential up or down, as the case may be, to generate the desired temperature differential. The trimming of the resistors is performed during initial manufacture. Typically this adjustment is done by trimming resistors $R_{20}$ and $R_{22}$. If the initial temperature differential is too small, $R_{20}$ is lowered ($R_{22}$ increased). If the temperature differential is too great $R_{22}$ is lowered ($R_{20}$ increased).

The circuit includes a second feature which is useful in compensating for differences in the respective TCR's of $R_h$ and $R_c$. The ratio of $R_7/R_8$ controls the temperature shift of $R_h$ for a given temperature shift in $R_c$ such that for all ambient temperature changes $R_h$ will track the changes in $R_c$. This compensation is called a gain G compensation or adjustment.

The following equations illustrate the relationship between the sensing resistor $R_h$, the compensation resistor $R_c$, the gain adjustment G and the temperature offset OS:

$$R_h = \frac{R_{19}}{R_{21}} \times \frac{R_7 + R_8}{R_7} \times (R_c + R_{22}) - R_{20} \quad (1)$$

$$G = \frac{R_{19}}{R_{21}} \times \frac{R_7 + R_8}{R_7} \quad (2)$$

$$R_h = G \times (R_c + R_{22}) - R_{20} \quad (3)$$

$$R_h = G \times R_c + (G \times R_{22} - R_{20}) \quad (4)$$

$$OS = G \times R_{22} - R_{20} \quad (5)$$

$$R_h = G \times R_c + OS \quad (6)$$

As can be seen in the circuit of FIG. 1 the gain G adjustment is a multiplier to $R_c$ compensating for a non-equal TCR relationship. The off-set OS is shown as an effective resistance bias value which yields an equivalent operating temperature differential (i.e. 80° C.).

In operation, the bridge circuit 14 will be balanced when $R_h + R_{20} = R_c + R_{22}$. Assuming that the TCR of resistor $R_c$ is approximately 3000 ppm/° C. to achieve the desired 80° C. temperature differential $R_h + R_{20}$ should be 2.4 ohms less than $R_c + R_{20}$ at room temperature. When the circuit is initially activated $R_h + R_{20}$ is less than $R_c + R_{22}$. In this case the bridge 14 is unbalanced. By the connection of $R_{19}$ and $R_{21}$ to the unity gain amplifier $A_1$, the transistor $T_s$ will not turn on until amplifier $A_1$ generates a positive output.

In the circuit of FIG. 1 the ratios of $R_{19}$ to $R_{21}$ are approximately 1/7 (approximately 14 ohms and 100 ohms). As such, in an equilibrium condition the current ($I_{21}$) through resistor $R_{21}$ is about one-seventh the current ($I_{19}$) through resistor $R_{19}$ (i.e. $I_{21} = 1/7 \times I_{19}$). In addition the current flow in the compensation or cold leg 18 and the sensing or hot leg 16 of bridge 14 are in the same ratio (i.e. 1:7). In air unbalanced condition the power transistor will heat resistor $R_h$ until $R_h + R_{20} = R_c + R_{22}$. If $R_h$ and $R_c$ are initially equal at room temperature (i.e. about 10 ohms) the bridge 14 will become balanced when $R_h$ is heated to approximately 12.4 ohms. At this point the voltage across the voltage divider $R_7 + R_8$ is equal to the voltage across $R_h + R_{20}$. The voltage across $R_7$ is equal to the voltage across $R_c + R_{22}$ and the output of amplifier $A_2$ will decrease and reduce the current delivered by the power transistor $T_p$. $R_7$ and $R_8$ may be chosen to be approximately equal to $R_{19}$ and $R_{21}$ respectively.

As air flows across the sense resistor $R_h$ it will be cooled, lowering its resistance. In this situation the output of amplifier $A_2$ goes high driving amplifier $A_3$ causing more current to flow through $T_p$ into the sense resistor $R_h$ heating it to bring it back to its nominal value of approximately 12.4 ohms and so maintains the desired temperature differential.

Similarly, if the air flow is such that $R_h$ is running too hot the positive voltage to amplifier $A_2$ is less than the voltage supplied to its negative terminal. As such the output of amplifier $A_2$ will go low causing less current to be supplied from the power transistor $T_p$. As $R_h$ cools its resistance decreases and brings the voltage across $R_7$ back to a value to balance the voltage across $R_c + R_{22}$.

Many changes and modifications in the above described embodiment of the invention can, of course, be carried out without departing from the scope thereof. Accordingly, that scope is intended to be limited only by the scope of the appended claims.

I claim:
1. A current controlled electronic circuit comprising:
    power driver means, adapted to be connected to a voltage source for supplying current response to a control signal; and
    means for maintaining a desired temperature offset between a first temperature variable resistor and a second temperature variable resistor comprising:
    a current bridge adapted to be positioned in an airflow having a sensing leg including said first temperature variable resistor and a first offset resistor connected in electrical series and a compensation leg including said second temperature variable resistor and a second offset resistor connected in electrical series;
    current stabilizing means connected to said sensing leg and compensation leg for causing the current flows in such leg to be a specified ratio, including a first amplifier having its positive input connected to a first resistor which is connected in series with said sensing leg and a second resistor, the output of said first amplifier is connected to a first transistor which completes a series connection between said compensation leg and said second resistor, said first and second resistors are chosen to generate said specified ratio;
    a first voltage divider connected across said sensing leg, said divider comprising third and fourth resistors having approximately the same ratio as said first and second resistors;
    a second amplifier having a positive input connected to a junction between said third and fourth resistors and its negative input connected to sense the voltage across said compensation leg and an output of said second amplifier communicated to and used to regulate said power driver means.

2. The circuit as defined in claim 1 including an output amplifier communicated to sense the voltage drop across the sensing leg to generate a signal indicative of the air flow.

3. The circuit as defined in claim 2 where the power driver means is a Power transistor and wherein the output of the second amplifier is connected to the base of the power transistor.

4. The circuit as defined in claim 3 wherein a buffer amplifier is connected between the output of the second amplifier and the base of the power transistor.

5. The circuit as defined in claim 4 wherein the value of the first temperature variable resistor is given by:

$$R_h = \frac{R_{19}}{R_{21}} \times \frac{R_7 + R_8}{R_7} \times (R_c + R_{22}) - R_{20} \quad (1)$$

$$G = \frac{R_{19}}{R_{21}} \times \frac{R_7 + R_8}{R_7} \quad (2)$$

$$R_h = G \times (R_c + R_{22}) - R_{20} \quad (3)$$

$$R_h = G \times R_c + (G \times R_{22} - R_{20}) \quad (4)$$

$$OS = G \times R_{22} - R_{20} \quad (5)$$

$$R_h = G \times R_c + OS \quad (6)$$

when G is a gain function to compensate for differences in the TCR's of the resistors $R_h$ and $R_c$ and
OS is a resistance equivalent to the desired temperature offset.

* * * * *